F. EICHERT.
MEANS FOR ATTACHING DYNAMO ELECTRIC MACHINES TO VELOCIPEDES AND THE LIKE.
APPLICATION FILED MAR. 18, 1912.

1,073,747. Patented Sept. 23, 1913.

(C-D)

Witnesses
C. N. Waller
L. G. Anger

Inventor
Fritz Eichert
by R. Hadden
Attorney

UNITED STATES PATENT OFFICE.

FRITZ EICHERT, OF BERLIN, GERMANY, ASSIGNOR TO THE FIRM OF GREIF AND SCHLICK, OF COBURG, GERMANY.

MEANS FOR ATTACHING DYNAMO-ELECTRIC MACHINES TO VELOCIPEDES AND THE LIKE.

1,073,747.  
Specification of Letters Patent.  
Patented Sept. 23, 1913.

Application filed March 18, 1912. Serial No. 684,568.

*To all whom it may concern:*

Be it known that I, FRITZ EICHERT, a subject of the German Emperor, residing at Berlin, in Germany, have invented a certain new and useful Improvement in Means for Attaching Dynamo-Electric Machines to Velocipedes and the like, of which the following is a specification.

The present invention relates to dynamo electric machines driven by friction with the wheels of velocipedes and the like, for example, for the purpose of supplying electric current to lamps, and the object of the invention is to provide an adjustable device enabling a machine of this class to be readily attached in such manner that the friction wheel is properly positioned in relation to the wheel whereby it is driven, the adjustment of the supporting device not being interfered with by temporary subsequent removal of the dynamo.

The invention is illustrated in the accompanying drawing, in which:—

Figure 1:
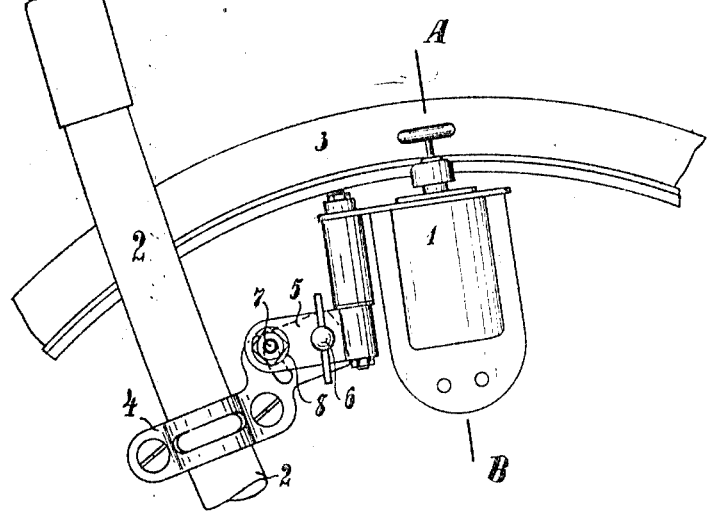
Figure 2:
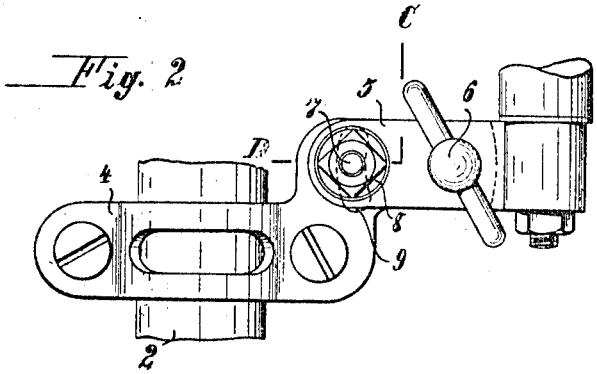
Figure 3:
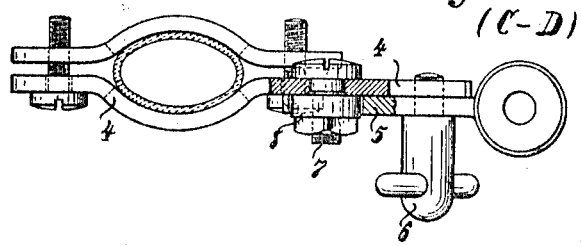

Figure 1 is a side view showing the generator fitted to the front fork of a bicycle: Fig. 2 is a side elevation of the fastening device drawn to a larger scale, and Fig. 3 is a plan view thereof, partly in section on the line C—D of Fig. 2.

The fastening device for the generator 1 comprises two main parts, the bracket 4 clamped to the fork 2 of the bicycle wheel 3 and a detachable part 5 fixed to the generator 1. The two parts 4 and 5 are connected by a wing screw 6 and a bolt 7, the latter passing through apertures in the parts 4 and 5 and being made fast by a nut 8. The part 5 with the generator 1 is pivoted on a smooth part of the shank of the wing screw 6. The bolt 7 passes through a curved slot 9 in the part 4, so that when loose it can take part in the movement of the part 5 about the axis of the wing screw 6. The nut 8 has a cylindrical collar which fits into a corresponding hole in the part 5, and the bolt 7 can be screwed up tight after adjustment in the slot 9, thereby setting the position of the part 5 and the generator 1, so that the axis A—B of the generator intersects the axis of the wheel 3. The bolt 7 is so arranged that its nut 8 can be operated from the front of the bracket 4, obviating the necessity of working through the spokes of the wheel. The part 5 with the generator 1 can be disconnected from the bracket 4 by unscrewing the screw 6 and slipping the part 5 over the nut 8, without interfering with the adjustment of the bolt 8, so that the generator is accurately positioned by merely replacing the screw 6, with the part 5 in engagement with the collar on the nut.

In my device, the part 5 serves the function of a dynamo-carrying member, said part 5 being rigidly connected to the dynamo 1 so that the part 5 and the dynamo are removable as a unit from the supporting bracket. Bolt 6 acts in a twofold capacity, first, as means for pivotally connecting the carrying member to the bracket, and, second, as means for clamping said carrying member fixedly in position on the bracket. The bolt 7 and nut 8 serve the purpose of a retaining member for preventing the carrying member from having pivotal movement on the bolt 6 relative to the bracket; but when the bolt 6 is unscrewed, the carrying member and the dynamo can be dismounted or removed without disturbing the position of bolt 7 and nut 8 in the arcuate slot of the supporting bracket, thus enabling the carrying member and the dynamo to be dismounted and replaced without disturbing the adjustment of the retaining member.

What I claim as my invention and desire to secure by Letters Patent of the United States is:—

1. In a device of the class described, the combination with a supporting bracket, of a dynamo-carrying member pivotally connected to said bracket and removable bodily therefrom, a retaining member adjustable on the bracket in an arcuate path with respect to said pivotal connection of the dynamo-carrying member, said retaining member engaging with said dynamo-carrying member for holding the latter against pivotal movement so that the dynamo will normally occupy a position insuring proper frictional contact with a driving member, and clamping means separate from said retaining means and operating to fixedly clamp said dynamo-carrying member in an operative position.

2. In a device of the class described, the combination with a supporting bracket, of a dynamo-carrying member, means coöperating with said bracket and the carrying